(12) United States Patent
Ascher et al.

(10) Patent No.: US 7,752,116 B2
(45) Date of Patent: Jul. 6, 2010

(54) LIQUIDITY ENGINE FOR FUTURES TRADING EXCHANGE

(75) Inventors: Thomas Ascher, New York, NY (US); David F. Harris, Ridgewood, NJ (US)

(73) Assignee: Nasdaq Liffe Markets, LLC, New York, NY (US)

( * ) Notice: Subject to any disclaimer, the term of this patent is extended or adjusted under 35 U.S.C. 154(b) by 2288 days.

(21) Appl. No.: 10/283,558

(22) Filed: Oct. 30, 2002

(65) Prior Publication Data

US 2004/0088242 A1 May 6, 2004

(51) Int. Cl.
*G06Q 40/00* (2006.01)
(52) U.S. Cl. .................. 705/37; 705/35
(58) Field of Classification Search ........... 705/36 R, 705/37, 38, 39, 40
See application file for complete search history.

(56) References Cited

U.S. PATENT DOCUMENTS

| | | | |
|---|---|---|---|
| 3,253,263 A | 5/1966 | Lee et al. | 340/172.5 |
| 3,573,747 A | 4/1971 | Adams et al. | 340/172.5 |
| 3,581,072 A | 5/1971 | Nymeyer | 235/152 |
| 3,594,503 A | 7/1971 | Wolf et al. | 178/88 |
| 3,596,254 A | 7/1971 | Highleyman et al. | 340/172.5 |
| 3,652,795 A | 3/1972 | Wolf et al. | 179/2 DP |
| 3,753,233 A | 8/1973 | Cardell, Jr. et al. | 340/172.5 |
| 3,770,941 A | 11/1973 | Gechele et al. | 235/61.7 R |
| 3,848,233 A | 11/1974 | Lotan et al. | 340/172.5 |
| 3,974,480 A | 8/1976 | Gernelle | 340/172.5 |
| 3,976,840 A | 8/1976 | Cleveland et al. | 179/2 DP |
| 4,032,946 A | 6/1977 | Wakatsuki et al. | 364/900 |
| 4,264,782 A | 4/1981 | Konheim | 178/22 |
| 4,275,456 A | 6/1981 | Tanaka et al. | 364/900 |
| 4,321,672 A | 3/1982 | Braun et al. | 364/408 |
| 4,334,270 A | 6/1982 | Towers | 364/300 |
| 4,346,442 A | 8/1982 | Musmanno | 364/408 |
| 4,376,978 A | 3/1983 | Musmanno | 364/408 |
| 4,412,287 A | 10/1983 | Braddock, III | 364/408 |
| 4,554,418 A | 11/1985 | Toy | 179/2 DP |
| 4,674,044 A | 6/1987 | Kalmus et al. | 364/408 |

(Continued)

OTHER PUBLICATIONS

William O'Brien (Access Fees and Fairness; Traders Magazine, New York: Jul. 1, 2002, p. 1).*

(Continued)

*Primary Examiner*—Hani Kazimi
*Assistant Examiner*—Hatem Ali
(74) *Attorney, Agent, or Firm*—Hamilton & Terrile, LLP; Michael Rocco Cannatti

(57) ABSTRACT

An automated futures trading exchange is provided that rewards market participants that provide liquidity to a central processing system and charges a fee to market participants that remove liquidity from the central processing system. The liquidity maker and the liquidity taker in each transaction is identified, and it is further determined whether the liquidity maker and/or the liquidity taker is a member of a market making class. By assigning a credit or a debit to the accounts of each market participant based upon whether a market participant to a transaction is a liquidity maker or liquidity taker or based upon whether the market participant is a market maker, a multi-factored and dynamic system is provided for promoting and controlling market liquidity. Additionally, different rates of debits and credits may be applied, using volume-tiered rates and the trading status of the trader.

20 Claims, 6 Drawing Sheets

U.S. PATENT DOCUMENTS

| | | | | |
|---|---|---|---|---|
| 4,677,552 | A | 6/1987 | Sibley, Jr. | 364/408 |
| 4,700,297 | A | 10/1987 | Hagel, Sr. et al. | 364/408 |
| 4,774,663 | A | 9/1988 | Musmanno et al. | 364/408 |
| 4,903,201 | A * | 2/1990 | Wagner | 705/37 |
| 5,063,507 | A | 11/1991 | Lindsey et al. | 364/408 |
| 5,136,501 | A | 8/1992 | Silverman et al. | 364/408 |
| 5,270,922 | A | 12/1993 | Higgins | 364/408 |
| 5,285,383 | A | 2/1994 | Lindsey et al. | 364/408 |
| 5,297,032 | A | 3/1994 | Trojan et al. | 364/408 |
| 5,563,783 | A | 10/1996 | Stolfo et al. | 364/408 |
| 5,689,652 | A | 11/1997 | Lupien et al. | 395/237 |
| 5,717,989 | A | 2/1998 | Tozzoli et al. | 705/37 |
| 6,014,643 | A | 1/2000 | Minton | 705/37 |
| 6,882,985 | B1 * | 4/2005 | Kay et al. | 705/37 |
| 6,963,856 | B2 * | 11/2005 | Lutnick et al. | 705/37 |
| 7,085,740 | B1 * | 8/2006 | Meyers | 705/37 |
| 2001/0042039 | A1 | 11/2001 | Rupp et al. | |
| 2002/0099640 | A1 * | 7/2002 | Lange | 705/37 |

OTHER PUBLICATIONS

Daniel P. Collins, Open but not quite equal markets, Futures, Chicago: Feb. 2002, vol. 31, Iss, 3; p. 3 pgs.*
Ivy Schmerken, "Electronic Trading"; Nasdaq Launches Liquidity Flags to Boost SuperMontage Volume; Mar. 28, 2003.*
Ukrine Business Report Weekly, NA-NPL-1.*
Directory of Products and Services- NPL-2.*
Foreign Ex hedgeing and the Interest rate Defense- NPL -3.*
William O'Brien ("Access Fees and Fairness": William O'Brien Traders Magazine, New York: Jul. 1, 2002,g.1).*
Securities and Exchange Commission (SEC) Proposed Rules/Federal Register, vol. 60, No. 195/Release No. 34-36310, Oct. 10, 1995.
"The Nasdaq Liffe Markets (NQLX) CONNECT™ details," version 0.9, May 3, 2002.
"The Application Program Interface (API) Getting Started Guide," Application Version 1, publication date Dec. 11, 2001.
Draft of "The Application Program Interface (API) Reference Manual," Application Version 1, Publication date Jan. 4, 2002.
"Nasdaq Liffe Markets (NQLX) Clearing Guide," NQLX Nasdaq Liffe Markets, undated (downloaded Apr. 10, 2002).
"Nasdaq Liffe Markets (NQLX) How the Market Works, A Guide to the Electronic Market," Application version 1.1 published Feb. 25, 2002, updated Mar. 1, 2002.
"How the Market Works, A Guide to LIFFE's Electronic Market," LIFFE, 2002.
Nasdaq Liffe Markets-FAQs, downloaded Sep. 20, 2002 from www.nqlx.com/NQLX/FAQ/FAQ.stm.
Nasdaq Liffe Markets-Technology and Operations Publications, downloaded Sep. 20, 2002 from www.nqlx.com/nqlx/publications/TechnologyPublications.stm.
Single Stock Futures-Nasdaq Liffe Markets, downloaded Sep. 20, 2002 from www.nqlx.com.
Nasdaq Liffe Markets-Operations/Presentation, downloaded Sep. 20, 2002 from www.nqlx.com/NQLX/TechOps/OpsBrief.stm.
Island Products and Services—Island Fee Schedule—Effective Sep. 5, 2002, downloaded Sep. 20, 2002 from www.island.com/prodserv/bd/fee/fee.asp.
Island Futures Exchange FAQ, downloaded Sep. 20, 2002 from www.island.com/futures/faq.asp.
Island Futures Exchange—"Are You, the Trader, Paying the Lowest Cost?" Sep. 20, 2002 from www.island.com/prodserv/bd/fee/comparison.asp.
Island Futures Exchange Rules, cover page, table of contents and last page, downloaded from www.island.com on Sep. 20, 2002.
Domowitz, Ian, "A Taxonomy of Automated Trade Execution Systems," pp. 607-631, published 1993.

* cited by examiner

LIQUIDITY ENGINE FOR FUTURES TRADING EXCHANGE

BACKGROUND

1. Technical Field

The present invention relates to the field of commodity futures trading technology. In one aspect, the present invention relates to a method and system for promoting liquidity in futures markets.

2. Description of Related Art

In response to increased global competition between financial markets, Congress recently changed the U.S. regulatory environment to allow US-based financial markets to list new derivative products. In particular, the passage of the Commodities Futures Modernization Act in December 2000 lifted a ban on trading futures on individual equity securities that had been in place since 1982. Single stock futures ("SSFs") are the first hybrid product listed in the U.S. that melds attributes of securities and futures. Although these products trade abroad on several foreign exchanges, as of today, no U.S.-based exchange or trading facility lists or trades SSFs.

A single stock futures contract (SSF) is an agreement to buy or sell shares of individual equity securities some time in the future at an agreed upon price. For example, someone who buys a March 2003 Intel futures contract has agreed to take delivery of 100 shares of Intel stock at a specified price in March 2003. Similarly, someone who sells a March 2003 Intel futures contract agrees to deliver 100 shares of Intel stock at a specified price in March 2003.

SSFs offer investors several important attributes. The three most commonly-cited are: (1) enhanced risk management; (2) reduced trading costs; and (3) short selling. First, investors may use SSFs to reduce risk in a portfolio in an efficient and cost-effective manner. For example, an investor, desiring to reduce its exposure to a certain equity security, may sell a futures contract on a single stock, thereby removing the equity security from an index fund that they hold. Similarly, an investor may want to increase its exposure to a certain sector security by purchasing a futures contract. For example, a mutual fund may want to temporarily increase its exposure to price increases of biotech companies by purchasing futures contracts on the Nasdaq Biotech Index, an exchange traded fund.

A second important attribute of SSFs is that they offer a leverage advantage when compared to shares of common stock. Leverage can be described as the amount of capital required to trade as compared to the value of the asset traded. When a small amount of capital is necessary to trade, the trade is described as "leveraged." If a person were to trade common stock, the person must pay at least 50 percent of the stock's purchase price (or post at least $25,000 at a firm offering daytrading margins, in which case 25 percent must be paid), with interest charged on the remaining percentage. In this case, a financing charge arises because funds are being loaned to the purchaser to buy the stock. In contrast, if a person were to purchase an SSF, the person is required to post only 20 percent of the purchase price. Because SSFs do not require payment for the actual stock unless the contract is held to maturity, there is no interest charged on the remaining percentage. In other words, the money posted in an SSF transaction is similar to a performance bond.

A third attribute of SSFs is the ability of a trader to more easily engage in transaction in which to profit from a decrease in the price of the equity security. Currently, traders can profit from a price decrease of an equity security by engaging in a "short sale." A short sale is the sale of stock not owned by the seller. Short sellers sell borrowed stock with the hope of purchasing the borrowed stock at a lower price sometime in the future. Often times, borrowed stock cannot be found, and therefore, a short sale cannot occur. Additionally, a trader must comply with the "up tick rule" before he can engage in a short sale. The up tick rule requires that a short sale may only occur on an up tick, i.e., the last sale was higher than the one previous to it. This rule makes it very difficult to engage in a short sale in a falling market. In contrast, SSFs are not subject to these restrictions—there is no stock to borrow and a person may be on the short side of a transaction at any time.

Unlike equity securities, SSFs are not fungible products. Fungibility refers to the ability to trade the same product across markets. For example, a person can purchase a share of IBM on the New York Stock Exchange and sell it on the The Nasdaq Stock Market. A share of IBM is said to be fungible. In contrast, many futures products, including SSFs, are not fungible. In other words, a trader cannot purchase an IBM futures contract on one exchange and sell (i.e., offset) it on another exchange. This is true even if the terms of the contract (e.g., size and delivery month) are the same at the two exchanges. For SSF contracts to be fungible, two or more exchanges must agree that all of the terms and conditions of a futures contract are the same, and must agree that the contracts are fungible. In addition, clearinghouses that will clear SSFs will have to create procedures that offset or effect delivery of a futures contract on an exchange that is different from the exchange in which the contract was intiated.

Historically, the futures markets have not competed against each other in fungible contracts. Once a market creates a contract, and captures initial liquidity in the contract, it is virtually impossible for another market to establish a competing pool of liquidity. As a consequence, rarely has price competition arisen across markets for substantially similar products. Because customers either will demand fungibility or the regulators will require it, SSFs may be one of the first futures products to be multiply listed and fungible across several futures and equity exchanges.

To promote liquidity, futures exchanges traditionally award franchises to specialists who undertake certain obligations for specified futures contracts. These obligations generally include agreeing to continuously provide both sell and buy orders for the specified futures contracts. In return, specialists receive incentives designed to compensate them for the risk of continuously providing liquidity. However, with respect to other liquidity providers, there are no incentives to bring liquidity to the market. This is more pronounced in the futures markets where there has not been competing pools of liquidity, and no need to reward liquidity provider who do not have a franchise.

In view of the foregoing, there is a demonstrated need for an automated futures trading exchange having enhanced liquidity by fairly rewarding all liquidity providers, as well as methods and apparatus for implementing same. Further limitations and disadvantages of conventional systems will become apparent to one of skill in the art after reviewing the remainder of the present application with reference to the drawings and detailed description which follow.

SUMMARY OF THE INVENTION

In a distributed or computerized network for trading futures contracts, the overall liquidity may be controlled through use of a dynamic fee allocation protocol which controls the assessment of fees and rebates to market participants based upon one or more factors that reflect how a market participant contributes to and/or remove liquidity from a market. In accordance with the invention, a screen-based electronic system is provided for trading futures commodity contracts between remote trading terminals, including a trading host connected to the remote terminals through a network, a consolidated order book for storing bids and offers from the remote terminals, a matching engine and database for matching bids and offers using a price/time priority algorithm, a wholesale trading facility that accommodates negotiated transactions of block trade size and permits order internalization, an error correction facility, and a fee calculation component for determining fees to be charged for each matched bid and offer. The fee calculator applies a rebate credit to the bid or offer that was submitted first to the trading host. This rebate may be tiered depending upon several factors including, but not limited to, volume and market participant. In addition, the fee calculator determines and applies a charge against any matched bid or offer that removes liquidity from the market. This can be determined based upon the respective submission times of the matched bids and offers, where a liquidity taker is the bid or offer that was submitted later in time. Any rebate credit that is applied can use a single flat rate or can use tiered rates, such as a volume-tiered rate which applies a different rate, depending upon the volume associated with the executed trade. Additionally, different rates may, for example, be applied to different market participants. For each market participant, a monthly report can be generated wherein all rebate credits that apply to that market participant's matched bids and offers are aggregated and applied against other trading fees assessed against the market participant. Such monthly reports can separately break out any applicable rebate, or can provide a single entry reflecting the combination of fees and rebates that apply. Where the trading host permits remotely programmable futures margin limit requirements on incoming bids and offers prior to storage in the limit order book, market integrity is protected.

In accordance with an alternate embodiment of the present invention, an automated system for trading single stock futures contracts over trading terminals is provided, including a centralized computing machine for receiving and storing bids and offers in a consolidated order book and storing related trading data, such as the submission time and a trading entity identification for each bid and offer. The automated system also includes a computer-based matching engine with pre-programmed matching prioritization algorithms for automatically matching bids and offers, including at least a price/time matching prioritization. The automated system also includes mechanisms to permit trade negotiation and internalization of orders. Trading details, such as time of submission data for each matched bid and offer, is assembled into a matched trade report. The matched trade report contains audit trail details that are used for market surveillance purposes on a trade date plus one day ("T+1") or longer basis. The matched trade report also contains details allowing for the clearance and settlement of transactions by an independent clearing organization on a T+1 basis. In an alternate embodiment, audit trail details and/or clearance information can be compiled and disseminated on any predetermined schedule (including on a real time basis) for surveillance and/or clearance purposes. The details contained in the match trade report are also used to calculate fees to promote market liquidity on a periodic basis. In particular, time value data for the matched bids and offers can be extracted from the matched trade report so that a rebated fee can be applied to the bid or offer having the earliest time value. In addition, a second rebated fee can be assessed by extracting trading entity identification information from the matched trade report to determine if a matched bid or offer was submitted by a market maker. The second rebated fee may give preference to trades submitted by market makers as compared to the rebated fees assessed against other traders, thereby enhancing market liquidity. In addition, trading volume data may be extracted from the matched trade report and used in the calculation of the rebated fees. For example, if the size of an executed trade is below a predetermined threshold or minimum requirement, then a first rebated fee might apply, but if the volume meets or exceeds the predetermined minimum requirement, then a second rebate fee would apply, thereby promoting increased trading activity and enhancing market liquidity. In addition to assessing rebated fees to the earliest bid or offer, charged fees may be assessed against the bid or offer that removes liquidity by virtue of being submitted later in time. In this embodiment, periodic statements of the trader activity may be generated that include an accumulated total of rebated fees and charged fees for all matched bids and offers submitted by a particular trader.

In accordance with yet another embodiment of the present invention, a method and protocol are provided for transacting sales of derivatives on a derivatives trading exchange, including receiving at a central processor, bids and offers from remote terminals and storing the bid and offer information along with associated time value for each bid and offer. All matching bids and offers are automatically executed by using a prioritization scheme. Using the time value data for the matched bids and offers, a liquidity maker is identified on the basis of whichever bid or offer was submitted first in time, and a rebated fee is calculated and assessed to the liquidity maker. The method and protocol can be used for any of a variety of derivatives contracts, including interest rates, swaps, equities, indices, exchange traded funds, futures commodity contracts or single stock futures contracts. In addition, for each matched bid and offer, a liquidity taker can be identified on the basis of whichever bid or offer was submitted last, and a debited fee may be calculated and assessed against the liquidity taker. Liquidity makers and liquidity takers may be assessed a preferred rebated fee or preferred charged fee if the bid or offer was submitted by a derivative market maker. In addition, size or volume thresholds can be used to apply differentiated rebates and charges, depending upon whether the size or volume meets or exceeds a predetermined threshold. By storing only bids and offers that meet predetermined futures margin requirements, the integrity of the market is protected.

In accordance with an alternative embodiment of the present invention, a computerized futures contract trading exchange is provided, including a network of client trading machines, where each trading machine includes a client trading application and an API and each client machine is configured to submit orders (such as bids and offers) and prenegotiated trades. In addition, a trading host is provided with a central order book for listing bids and offers and for automatically matching bids and offers using one of a plurality of available prioritization algorithms. A trade registration system is also provided for assembling trading data on all matched and prenegotiated trades. The trading registration system also generates an audit trail report after the close of trading each day, and generates a matched trade report after the close of trading each day. In addition, a fee system is provided for calculating fees associated with each matched trade by providing at least a rebate for all orders that qualify as liquidity makers. An independent third party provides a clearing house for clearing and settling matched trades after the close of trading each day based upon information contained in the matched trade report. In addition, an independent third party regulator performs audit trail compliance monitoring on executed trades after the close of the trading day, based on information contained in the audit trail report.

Thus, various aspects of the present invention provide an improved computerized derivatives contract trading exchange which is used for transacting sales of a derivatives contract using a plurality of remote trading machines. Included with the exchange is a fee calculation processor for calculating a fee associated with a trade by providing a preferential fee for any bid or offer that qualifies as a liquidity maker. A rate schedule is provided as a component of the overall system that includes transaction fees and/or rate tiers, and that controls the billing rates and amounts for various tiers of options. The rate schedule may be flexibly configured to provide tiered rates that are definable by volume levels and/or transaction type. In addition, the rate tiers and transaction fees may include date limitations defining the temporal limits of when the rate tiers and fees are valid. In addition, the rate schedule may include default rates, which can be defined at a global level, firm level or ITM level. In addition, the rates can be different for ITMs within firms, and can be either negative or positive. The rate schedule aspect of the present invention allows for manual adjustment of a rate for a given date range. In addition, minimum and maximum values are provided for every rate tier.

DETAILED DESCRIPTION OF DRAWINGS

Figure 1:
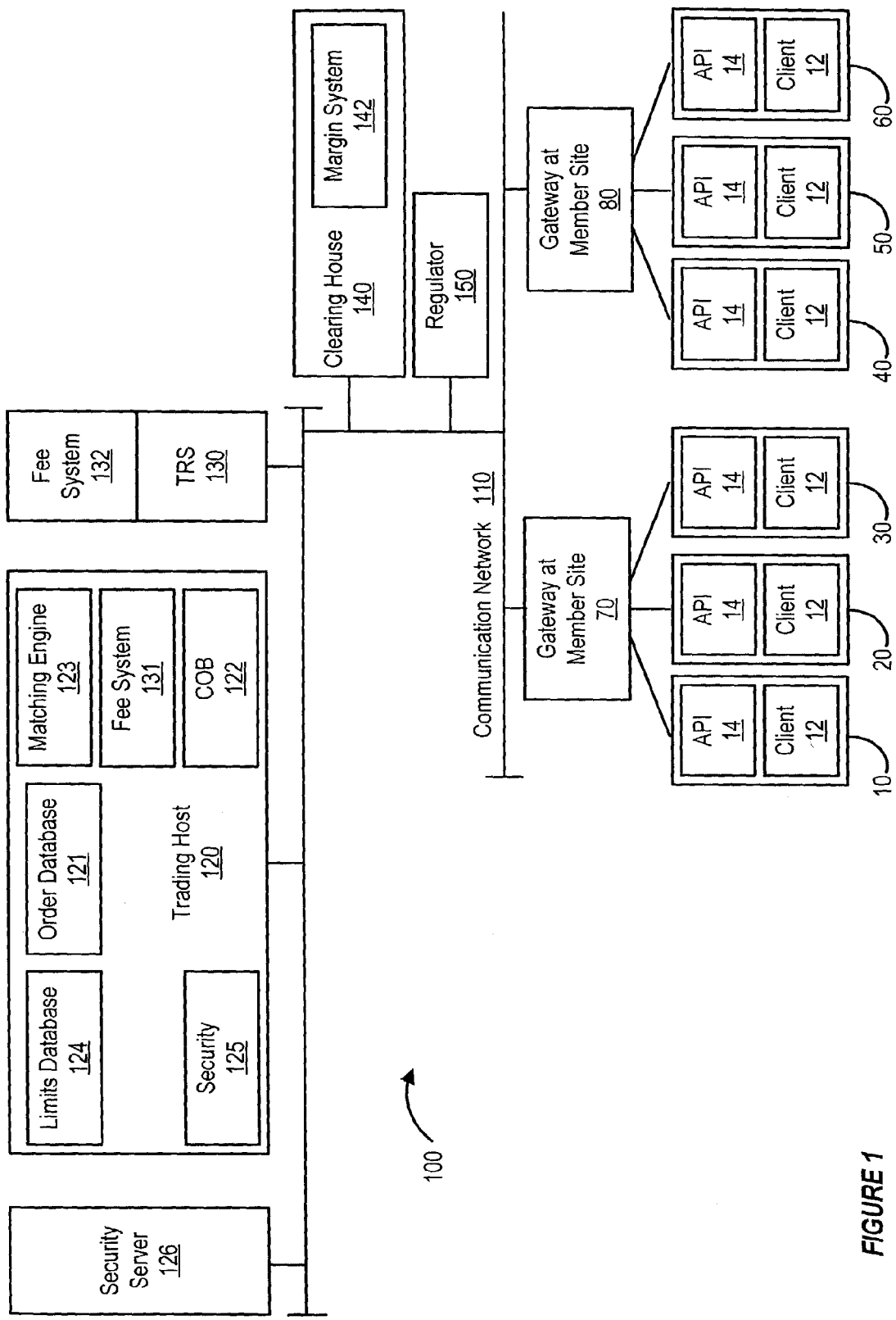
FIG. 1 is an overall schematic design of a futures trading exchange system in accordance with a selected embodiment of the present invention that promotes the creation of liquidity in futures markets within a client/server based computer system.

FIG. 1 shows an overall schematic design of an exemplary futures trading exchange distributed network 100 over which futures contracts are traded. Clients, member firms and other traders at trading terminals (e.g., 10, 20, 30) communicate through a network 110 to a trading host 120 using a framework of standardized interconnection mechanisms (such as, for example, Internet Protocol ("IP") and multicast technology). From the perspective of futures traders, the liquidity of the available futures markets and the ability to automatically match orders are of primary importance in providing an efficient futures trading system. In accordance with the present invention, futures contracts can be readily traded by clients by using the electronic futures trading and order matching system illustrated in FIG. 1 and described herein.

The trading host 120 provides a central order processing facility for receiving and matching orders. In function as the central order processing facility, the trading host 120 may provide for order matching, order entry and storage, price reporting and dissemination, order and trade display, depth of market and/or margin calculation. Orders may be matched anonymously in the trading host so that traders are not aware of whose orders they have traded against. By providing price reporting and dissemination on a real-time basis throughout the trading day, traders are able to view all available prices and aggregate volume in a specific contract month, series, or strategy at any point during the trading day and to continuously track full market depth.

In addition to, or as part of, the trading host 120 is the trade registration system (TRS) 130. The trading host may be configured to transmit details of all executed trades to trade registration system 130 on a real-time basis throughout the trading day, or on some other predetermined basis. The trade registration system 130 may be made available via a terminal emulation package to a trading member's back office where it can be used throughout the trading day to check the member's trading activity, confirm the status of individual trades, assign trades to the member's clearing accounts, and/or to allocate trades to or claim trades from other members.

At the end of the trading day, the trade registration system 130 generates a matched trade report containing pertinent data for the trades matched during the day. In addition, the trade registration system 130 submits trade files to the clearing house 140 for registration and settlement. By accessing the trade registration system 130, trading members can check their trading activity and the status of individual trades and may complete registration by assigning trades to the correct account for margining and position-keeping, as well as adding account references and allocating or claiming trades. Although full counterparty information is passed to the trade registration system, this information will not be displayed on user terminals to ensure post-trade anonymity.

Using a communication network 110, individual client machines (e.g., 10, 20) communicate with the trading host 120. In one embodiment, each client machine includes a client trading application 12 and an application program interface 14 (known as the API), where the API serves as an interface program on the client machine to effectively intermediate between the trading host 120 and the client trading application 12. In an API embodiment, the client trading application 12 may be proprietary front-end trading application software developed by the client trader, an industry standard trading program, or a third-party software program developed for the client trader. Alternatively, the client machines may be pre-configured with trading functionality to interact directly with the trading host 120, such as by way of factory installed software or by way of software that is downloaded or electronically transferred and installed on the machine by the trader. In addition, the client machine (e.g., 10, 20) may be implemented as a web-based trading platform using Internet protocols. However implemented, the client machine presents the trader with a menu of trading options and trade data for the trader to use, and allows traders to link their computers directly to other systems (e.g., those dealing with trade capture and order management) to facilitate more efficient trading activity.

Orders processed by the trading host 120 may include limit orders and market orders. Order volume parameters may be specified. For limit orders, cancellation parameters also may be specified. Good Until Cancelled ("GTC") orders, rather than being cancelled automatically at the end of the business day, are held until an optionally specified date (unless withdrawn by the trader) or until the contract month they relate to expires. Immediate and cancel orders are executed against any existing orders, and any unfilled portion of the order is immediately cancelled. The volume, price, or GTC cancellation date of orders in the order book may be revised, and orders may be withdrawn from the order book at any time during trading.

For each order processed by the trading host 120, a time stamp value is assigned to the order and associated with the order in the order database 121. In a selected embodiment, the time associated with an order is the time of arrival at the trading host 120. Alternatively, the time value is the time of submission at the trader's workstation. In addition or in the alternative, orders have associated therewith predetermined trading data, such as a member identification, both for the originating member and the counterparty; the identity of the individual submitting the order to the trading host; order slip identification; trade date information; the identity of the individual completing the order slip; customer identification; whether the order is to buy or sell; the volume, contract, and delivery month; physical data; the price or price limit, price range or strategy price; and/or, where relevant, the strategy type indicator.

The trading host 120 receives and matches orders in the central order book 122 ("COB"). Order matching in the central order book can be based on a variety of prioritizations, and may be implemented by a matching engine 123. In a selected embodiment, orders are matched using a price/time priority which gives priority to the highest bid/lowest offer over other bids and offers in the same contract month/strategy. This matching algorithm also gives priority to the first order at a price over all other orders at the same price which will, in turn trade according to the time they were accepted by the host.

In addition or in the alternative, trading host 120 matches orders using a price/pro-rata priority which allocates fills as a weighted average percentage of the volume attached to each bid or offer at the inside price. With price/pro-rata priority, all orders at a price have the same priority, and orders are filled in proportion to their volume. When combined with minimum and maximum volume threshold requirements, the pro-rata algorithm requires that the first bid or offer at the inside market with size equal to or larger than the minimum volume threshold but no greater than the maximum volume threshold is fully executed before filling any other bids or offers at the same price. These thresholds are designed to prevent a large volume time priority order from locking the market and to prevent small volume time priority orders from taking priority over larger volume orders in the queue.

In a selected embodiment, the trading host 120 matches orders in the central order book 122 according to algorithms specific to each futures contract. For example, for one type of contract, the trading host matches orders with strict reference to price and time priority, while other types of contracts, orders are instead matched with strict reference to price and pro-rata priority.

Other matching priority rules can be implemented in accordance with the present invention to take into account alternative or additional prioritization factors, such as price, size, time, identity of the originating member or counter party. Examples of such matching priorities included price/size priority, price/time/size priority, first come, first served priority, price/size/time priority, or price/trading entity priority (with price ties being broken on the basis of a prioritized ranking of trading entity classifications).

In addition to having one or more matching prioritizations, the trading host 120 may also include a limits database 124 that determines price limits and/or margin limits for each futures contract. These limits may alternatively be distributed or implemented in other locations within the futures trading exchange network 100. Whether determined on an individual contract basis or as a group for multiple contracts, price limits are used by the trading host to reject attempts to enter orders for prices outside these limits.

Similarly, margin limits and requirements for orders may be stored in the limits database 124 for use by the futures trading exchange network 100 to control order entry. By providing a margin compliance check in the futures trading exchange, market integrity is protected. Margins in the futures world are very different from margins in the stock world. In futures, margins do not represent a down payment, but rather a performance bond or a promise. Futures margin money goes against the trader's promise to make or take delivery of the underlying shares of stock at delivery time. If the market does not go in the trader's favor, the trader must post additional margin, a maintenance margin call, to ensure that the trader's promise is still intact. Through the trading host 120, the margin may be determined based on the volatility of the market. Rapidly moving markets normally have higher margins, and slower markets will have lower margins. Because a margin requirement is a performance bond that ensures the exchange clearing house against loss, the margin requirement may be determined by the clearing house 140 and transferred to the trading host 120. The present invention allows margin limits and requirements to be remotely or automatically controlled in keeping with the dynamic nature of the futures market.

As an addition or alternative to the automated matching aspect, the futures trading exchange of the present invention permits pre-negotiated or wholesale trades to be executed by the trading host 120 without the use of automated matching engine 123. The wholesale trading facility permits the immediate execution of pre-negotiated business (block and Exchange for Physical, "EFP"), provided that both a bid and offer exist in the central order book 122 for the relevant contract month or strategy. As a result, the buy and sell legs of the pre-negotiated trade can be submitted without any time delay. Where there is no bid or offer present for the relevant contract month or strategy, then a request for quote (RFQ) must first be submitted for the relevant contract month or strategy. The trader must then wait a predetermined amount of time before the pre-negotiated trade is reported.

Once an order has been executed, the two sides to the trade will be notified by the trading host 120. In addition, trade details are automatically input into the trade registration system 130.

As depicted in FIG. 1, a communication network 110 connects the trading host 120 to the client machines (e.g., 10, 60) via gateways 70, 80. The network 110 may be a telecommunication network, Internet-based network, local area network (LAN), wide area network (WAN), a plurality of server and client machines, a broadband and/or wireless communication network. The gateway devices may be server machines located at member firm facilities, service delivery platforms used for more localized networks (such as LANs or WANs). In a selected embodiment, the member gateway 70 is a server which acts as intermediary between the trading host 120 and the client trading application 12. It will be appreciated that gateway devices may not be required for selected network instances of the present invention, such as a network of wireless handheld devices.

For security and compliance purposes, access to the trading host 120 may be limited or restricted to pre-approved trader entities. Such pre-approval may be used to identify and distinguish between individual traders, members firms holding a trading subscription, back office systems for member firms, contractual market makers, clearance entities, regulatory entities, etc. Different levels of access may be permitted, depending upon the classification of the trading entity. In one embodiment, a mapping of futures contracts and approved members is stored in the trading host 120 and operates to prevent an unauthorized trader from accessing contract data and entering orders for impermissible contracts. While access to the trading host 120 may be restricted to certain trading members, a non-member to transmit orders to a member using an order-routing service provided by a third party (e.g., a quote vendor). Such orders should be provided to the trading host with predetermined validation and recording requirements for purposes of identifying such orders as routed orders.

To implement these security protections, the trading host 120 may include a security system 125 for providing authentication, confidentiality, and system integrity. Alternatively, the security system features may be implemented with a separate central security server 126. The security system is responsible for maintaining the database of currently certified users, authenticating certified users as they log on, distributing session keys as part of the login process and/or maintaining a list of currently logged-on client trading applications. All trading entities using the futures trading exchange network 100 must first log in to the security system 125 or security server 126. Once the trading application (e.g., 10) that initiated the request has undergone authentication with the security server, it can establish communication with the trading host 120 by initiating mutual authentication and key exchange. Encryption is used for user security login and for user authentication, and ensures that the sender cannot be identified by entities outside of the system. Communication is permitted only between the trading host and the trading applications, between the security system 125 (or security server 126) and the trading host 120, and between the security system 125 (or security server 126) and the trading applications (e.g., 12).

As depicted in FIG. 1, the regulatory and compliance function is performed by the regulator 150, and trades are cleared by a clearing house 140. The futures trading exchange is configured to transmit trading data to the regulator 150 on a predetermined basis, such as a "trade date plus one day" basis ("T+1"). Likewise, the futures trading exchange may be configured to transmit trades to the clearing house 140 at the end of the trading day or some other predetermined basis.

Figure 2:
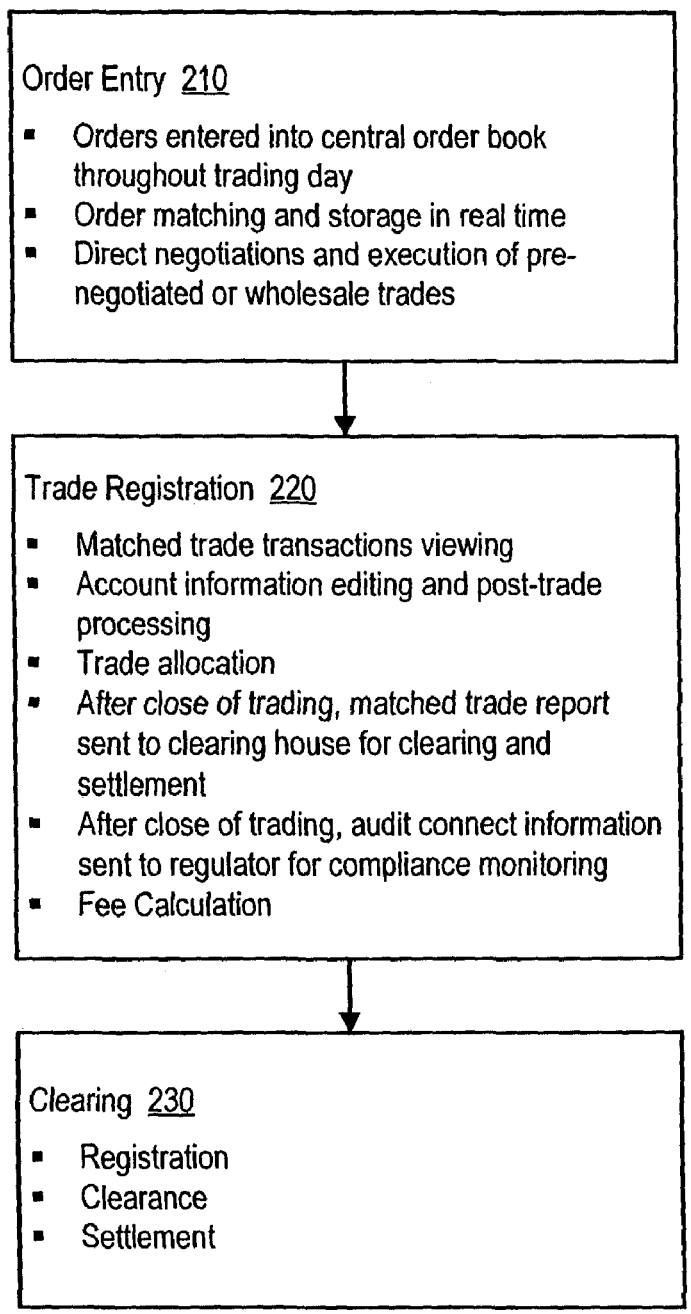
FIG. 2 illustrates the overall sequence of order entry, matching and clearance used in one embodiment of the invention.

The overall clearing process is illustrated in FIG. 2, which shows that orders are entered throughout the trading day into the trading host at step 210. At this stage, orders are matched or stored subject to any additional order instructions such as GTC or action taken by the trader to revise or pull the order. In addition, pre-negotiated trades may be entered into the trading host at step 210 without interacting with any orders in the central order book.

As depicted at step 220, account information and matched trade transaction data may be viewed and/or edited in trade registration system 130 through the course of the day. After the close of trading, required trade information is sent to clearing house 140 for clearance at step 230. Likewise, required trade information is sent to the regulator 150 for audit-trail and compliance monitoring purposes. Thus, the clearing process 230 starts with entry of the details of an executed order into the trade registration system, though the actual clearance function is preferably performed by an independent third party 140. The trade registration system carries out end of day processing and transmits the details of matched trades to the clearing house 140. The clearing house 140 implements registration and settles contracts as part of the trade clearing.

In addition or in the alternative, the clearing house 140 may require margin payments in accordance with its own procedures through use of a margin system 142. Alternatively, the margin requirements may be implemented as a component of the trading host or trade registration system (e.g., 124). Regardless of where implemented, the margin system 142 sets forth requirements for member traders to make payment of variation margin and cover for initial margin for new positions. The margin requirements for a specific trading member are transferred to that member's trading terminal (e.g., client machine 50). The margin requirements can be displayed at or forwarded from the client machine 50 for viewing, storage or printing. In addition, the client machine for the trading member may include a client margin module which is used by the trading member to call higher amounts of initial margin from their customers and/or where relevant, their non-clearing members, to reflect the higher risk in relation to such customers.

In accordance with the present invention, futures trading exchange may include a fee calculation system for controlling and assessing the fees and costs for trading futures contracts. The fee calculation system may be centralized as part of the trading host or trade registration system, or may instead by distributed across individual components of the exchange. For example, the trade registration system may include a fee system 132 for determining and charging trading members a standard transaction fee per lot, per side. In addition or in the alternative, the clearing entity 140 may charge a small per lot, per side clearing charge. These standard fees may be separate from or combined with the rebate and charges discussed further hereinbelow. Alternatively, the fee calculator may determine a rebated fee by using a rebate rate schedule. It will be appreciated that the rebated fee may determined as a percentage discount from a standard fee, or may be determined by reducing the standard fee by a fixed amount, or may be determined by eliminating entirely any fee or charge for the transaction, or may be otherwise determined in a way calculated to reward predetermined trading activities, such as liquidity promoting trading activities.

In accordance with the futures trading exchange of the present invention, a market may be structured to reward market participants that provide liquidity to the central processing system ("liquidity makers") by providing a zero charge, a rebate or other incentive to the liquidity makers. In addition or in the alternative, the market may be structured to charge a fee or other disincentive to market participants that remove liquidity from the central processing system ("liquidity takers"). Using predetermined trading data, the present invention identifies the liquidity maker and the liquidity taker in each transaction. In a selected embodiment, liquidity makers and liquidity takers are identified on the basis of the time values assigned to the orders, so that the liquidity maker is the order with the earlier time value from a matched or executed transaction, and liquidity taker is the order with the later time value from a matched or executed transaction.

Alternatively or in addition, liquidity makers and liquidity takers are identified on the basis of the trade size or volume values assigned to the orders, so that the liquidity maker is the order belonging to the trader with the larger size or accumulated volume over a given time interval, and liquidity taker is the order belonging to the trader with the smaller size or accumulated volume over a given time interval. The liquidity maker and liquidity taker can also be identified on the basis of meeting certain threshold or minimums requirements for trading volume or order flow activity. In addition or in the alternative, the present futures trading exchange system can determine the liquidity maker and/or the liquidity taker on the basis of whether the trader is a member of a predetermined trading class, such as a market making class of trading members.

Figure 3:
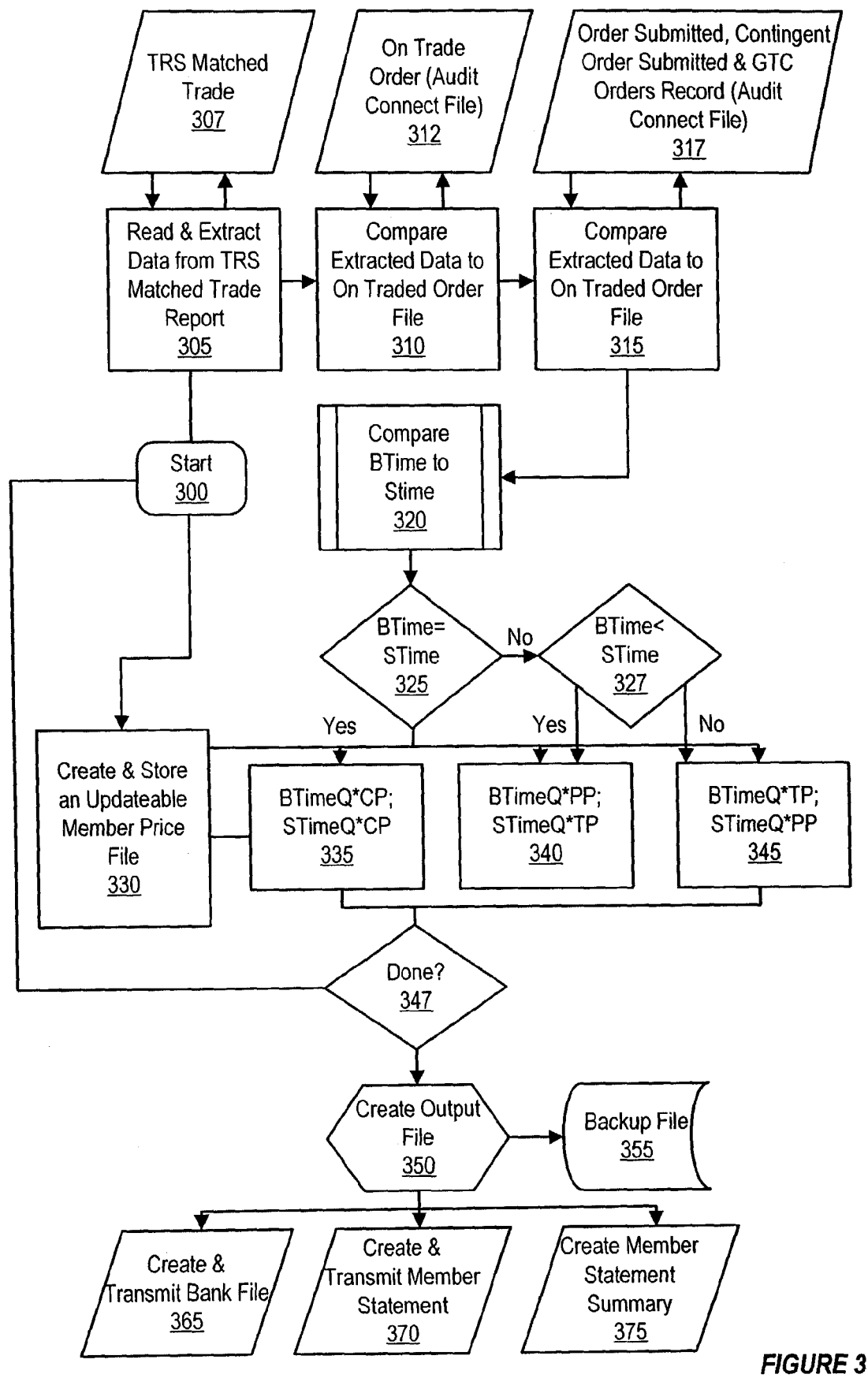
FIG. 3 is an exemplary flow diagram of the pricing plan system according to the present invention, illustrating a procedure for allocating fees and rebates on futures trading activity for the purpose of promoting liquidity of futures markets.

FIG. 3 illustrates an exemplary flow diagram of the pricing plan system according to a selected embodiment of the present invention, illustrating a procedure for allocating fees and rebates on futures trading activity for the purpose of promoting liquidity of futures markets. As illustrated with the example of FIG. 3, the futures trading exchange of the present invention assigns a credit or a debit to the accounts of each market participant based upon whether a market participant to a transaction is a liquidity maker or liquidity taker. A liquidity maker will receive a credit in its account that is slightly less than the debit a liquidity taker receives in its account. If a market participant to a transaction is a futures market maker, the rate of debit or credit may differ from the rate of debit or credit received by other market participants.

In connection with the method depicted in FIG. 3, an updatable member price file is created and stored at step 330. It will be understood that the file can be maintained at the trading host 120, trade registration system 130, or at any appropriate location within the network 100. The member price file maintains member specific information, such as bank information, clearing firm information, predetermined rate information, volume thresholds or minimums, contact information and symbol override. Members can be added and deleted from the member price file. In addition, different types of rates may be established for a particular member, such as a first rate that applies when the member is a liquidity provider, a second rate that applies when the member is a liquidity taker, and a third rate that applies when the member is a participant in a block trade, and a fourth rate that applies to cross transactions. Volume threshold information, such as minimum and maximum limitations, can also be changed. The dynamic and remotely programmable nature of the member price file advantageously permits the incentives and disincentives for trading activity to be adjusted in response to changed conditions in the futures market.

To illustrate an example of how the present invention works, FIG. 3 illustrates a starting point 300 for purposes of explanation. The method described herein can be initiated at any time, but is preferably run on a monthly basis in connection with generating the fee statements for trading members. Upon initiation at step 300, data is extracted from each side of the matched trades to determine which party added liquidity and which party removed liquidity from the given market. In an embodiment of the present invention where the liquidity maker is defined as the earlier of the two orders that were matched, the time stamp for each order that was matched is extracted from the recorded trade history. While the associated time stamp information for the underlying orders can be extracted from the pertinent trading data using any of a variety of techniques, FIG. 3 illustrates one example wherein time stamp data is obtained at step 315 from storage (317), using address location data collected at steps 305 and 310 from storage (307, 312, respectively).

In particular, data from the matched trade report 307 is extracted at step 305. For both sides of the trade, the extracted data could include the order slip identification, trade price, trade volume, buy or sell indication, originating member identification, counter party identification, physical and trade date.

Additional data is obtained at step 310 from the on trade order portion of the audit connect file 312. For both sides of the trade, this additional data may include the order identification. This comparison at step 310 is undertaken to match the order slip number to the TRS order number.

The data collected at steps 305 and 310 is then used at step 315 to locate time stamp information from the audit connect file (317). Upon matching the order identification to the market reference data, the time stamp for both the buy order and sell order is extracted at step 315. In particular, the order submitted, contingent order submitted and GTC order record from the audit connect file 317 are compared to the extracted data to obtain the time stamp data for the matched orders. In this step, the time stamp for the buy order becomes the "B Time" value for the buy order, and the time stamp for the sale order becomes the "S Time" for the sell order.

In an alternative embodiment, the comparison step 315 extracts time stamp data by matching the order identification to the market reference data, matching the physical to the commodity key, matching the order volume to the trade volume, matching the ITM ("individual trade mnemonic") to the originating member and matching the order price to the trade price.

However extracted, the time values for both sides of the matched trade under consideration are compared at step 320 to determine which occurred first in time. In the example of FIG. 3, a simple comparison of the B Time value to the S Time value at steps 325 and 327 will determine which side of the match should be treated as the liquidity maker. If the time value for the buy order and sell order are the same (step 325), then neither side of the transaction is treated as a liquidity maker or liquidity taker (step 335). For example, a liquidity designation field associated with each side of the matched trade may be set to a predetermined value (such as 0) for subsequent use in the fee calculations to designate that neither side of the transaction contributed or removed liquidity. Alternatively, special categories of trades, such as a crossed trade may be treated as having occurred simultaneously and the underlying buy order may be assessed a predetermined fee or price (BTimeQ*CP, where "CP" stands for "cross price") and the underlying sell order may be assessed a predetermined fee or price (STimeQ*CP, where "CP" stands for "cross price") at step 335.

If the buy and sell time values are not the same (step 325), their comparison at step 327 determines if the buy order was submitted first. If so, the buy order is treated as the liquidity maker at step 340. For example, the liquidity designation field for the buy order could be set to a predetermined value (e.g., 1), indicating that the buy order added liquidity to the market. Simultaneously, the liquidity designation field for the sell order could be set to a second predetermined value (e.g., 2), indicating that the sell order removed liquidity from the market. With such a trade where the buy order is the liquidity provider, the underlying buy order may be assessed a predetermined fee or price (BTimeQ*PP, where "PP" stands for "provider price") and the underlying sell order may be assessed a predetermined fee or price (STimeQ*TP, where "TP" stands for "taker price") at step 340.

If it was determined at step 327 that the timing of the two orders were reversed, then the sale order would have occurred earlier in time and would be treated as the liquidity maker at step 345. Likewise, the buy order would be the liquidity taker. With such a trade where the sell order is the liquidity provider, the underlying sell order may be assessed a predetermined fee or price (STimeQ*PP, where "PP" stands for "provider price") and the underlying BUY order may be assessed a predetermined fee or price (BTimeQ*TP, where "TP" stands for "taker price") at step 345.

This sequence of steps can be repeated until all of the executed trades have been analyzed (step 347), at which time an output file would be created (step 350) containing an indication for each side of all matched trades whether that side is to be treated as a liquidity maker or a liquidity taker. In the example described above, the indication would be a liquidity designation field. The output file can be stored in backup (step 355) and the process can be concluded (step 360).

The output file can also be used to automatically create and transmit statements and reports to various entities involved in the futures exchange. For example, a bank file can be created at step 365 that conforms to a bank's specific requirements with a duplicate file automatically created for the accounting records.

In addition, member statements can be automatically generated (step 370) for transmission to individual members. In accordance with the present invention, electronic statements can be generated for each member by extracting from the output file for each member details about that member's trading history. For example, for each executed trade in which a particular member was involved, the member statement would include the member name information, trade date, physical, trade quantity, price, extension, and clearing member information.

As part of the price information or as an additional item in the member statement, there may be a separately calculated rebate entry and surcharge entry in the member statement 370, reflecting respectively any rebates granted to the member by virtue of an order being treated as a liquidity provider and any surcharges imposed on the member by virtue of its order being treated as a liquidity taker. The rebate information could be the only additional price information provided in situations where there is no surcharge applied, or alternatively, there could be a surcharge entry on the member statement in situations where rebates are not granted. In yet another embodiment, the rebate and surcharge values could be combined or netted over the course of the reporting period and included on the member's statement. In addition to the foregoing information, the member's statement may include a monthly total of all activity and fees for the member, and may also specifically identify individual trader and trade subtotals, along with member subtotal and member total information. In addition, a member statement summary can be generated (step 375) which provides a summary of the member's statement.

Figure 4:
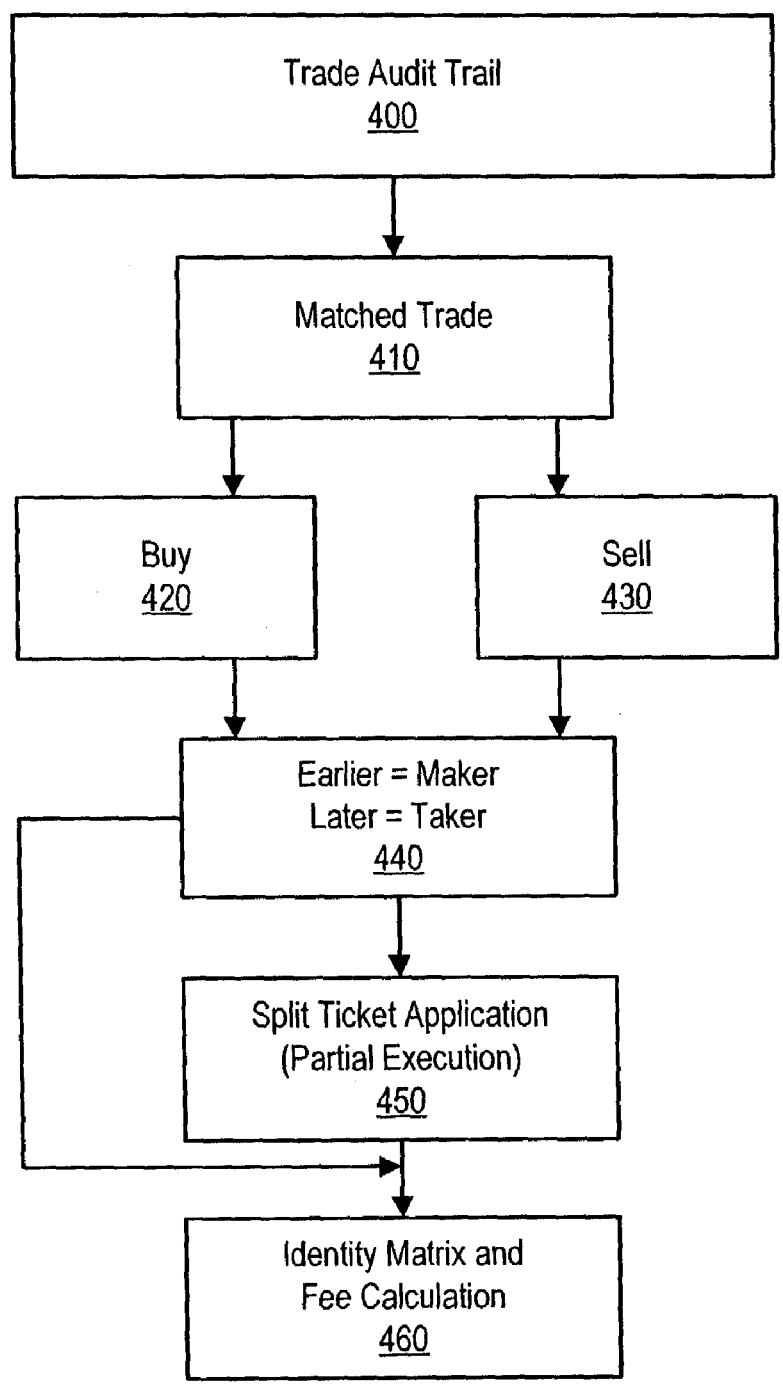
FIG. 4 shows an alternate embodiment of the derivatives trading exchange system which uses a maker/taker determination to promote market liquidity in accordance with the present invention.

FIG. 4 depicts an alternate embodiment of the present invention for use in promoting liquidity in a derivatives market. Over the course of a predetermined length of time, an audit trail is accumulated for all derivatives trading activity at step 400. As will be appreciated, the audit trail includes detailed trading data for each executed derivatives contract, including details for the underlying buy and sell orders that were matched to form the executed contract. A database of the trade data for all matched trades is assembled at step 410, and the trading details for the underlying buy and sell orders are extracted at steps 420, 430. In a selected embodiment, the database assembly and data extraction (and other steps described herein) may be performed using microprocessor-based computing machines and/or software, such as a mainframe computer, workstation computer, desktop PC, laptop computer, client/server machine, personal digital assistants, microcomputer or other equivalent computing functionality.

For each matched trade, whichever of the buy and sell order for that trade occurred earlier in time is considered to have added liquidity to the particular derivatives market, and the later of the buy and sell order is considered to have removed liquidity from the market. Thus, in step 440, the earlier of the buy or sell order for a particular matched trade is defined as the liquidity maker. In addition, or in the alternative, the later of the buy and sell order in the matched trade is defined as the liquidity taker. The definition of an order as a liquidity maker or taker is associated with the order in the output file.

In the event that a matched trade is based on an underlying buy or sell order that was only partially executed, the trade report data information corresponding to the unexecuted portion of the underlying buy and sell order may be updated to reflect the fact of partial execution at step 450. For example, the time value for the unexecuted portion can be changed to reflect the data of partial execution, or it may retain the original time value date when the order was originally placed.

Once the liquidity makers and liquidity takers have been identified for each or all of the matched trades, trading entity identification information is used to assemble and calculate fee information for each trading entity at step 460, using the status of each order that acted as a liquidity maker to generate a rebate to the member associated with that order. In addition or in the alternative, each of the orders that is identified as a liquidity taker is assessed a charge at step 460.

By calculating the fees to provide the rebates for liquidity makers, the present invention provides an incentive for traders to place orders early. This same incentive will promote traders to post competitive or price-improving offers so that a trader can improve his or her chances of obtaining a rebate. Likewise, if the fee calculation provides for a charge against traders who remove liquidity from the market, this will also incentivize the market to promote liquidity instead of removing liquidity. If both rebate and charges are assessed as part of the fee calculation, the combined effect would be to promote liquidity for the derivatives market.

In accordance with the present invention, additional factors can be included in the fee calculation 460 to provide a more sophisticated influence on the derivatives market liquidity by using one or more volume thresholds as a requirement for obtaining a particular rebate or charge. For example, the charge for removing liquidity could be tiered at a first rate per executed share for trades that remove liquidity from the central order book up to a total monthly volume of 200,000 shares, and a second rate could be charged per executed share for trades that remove liquidity from the central order book over 200,000 shares in total monthly volume. If the charge rate is lower for the higher monthly volume, then traders may be incentivized to increase their trading activity. Alternatively, the charge rate for the first 200,000 shares could be set lower than the charge rate for larger volume trading in order to attract and promote futures trading by individuals.

The rebate calculation can also be based in part upon consideration of volume. For example, if the rebate rate for the first 200,000 shares of total monthly volume that add liquidity market is lower than the rebate rate for liquidity adding shares over 200,000, then the futures market will be incentivized to create additional liquidity. As will be appreciated, the relative magnitude of the rebate rate and charge rate will influence the futures trading market liquidity. For example, by applying a uniform rebate rate that is greater than any charge rate (tiered or otherwise), then traders will on balance be incentivized to add liquidity to the market. Of course, even if the charge rate is higher than the rebate rate, traders will be incentivized to add liquidity to the market. Alternatively, if the total fee for a liquidity removing trade is less than the total fee for a liquidity adding trade, then the traders will be incentivized to remove liquidity from the futures trading market. The present invention allows the overall trading dynamics to be influenced by the fee calculation which incentivizes selected liquidity activity.

Figure 5:
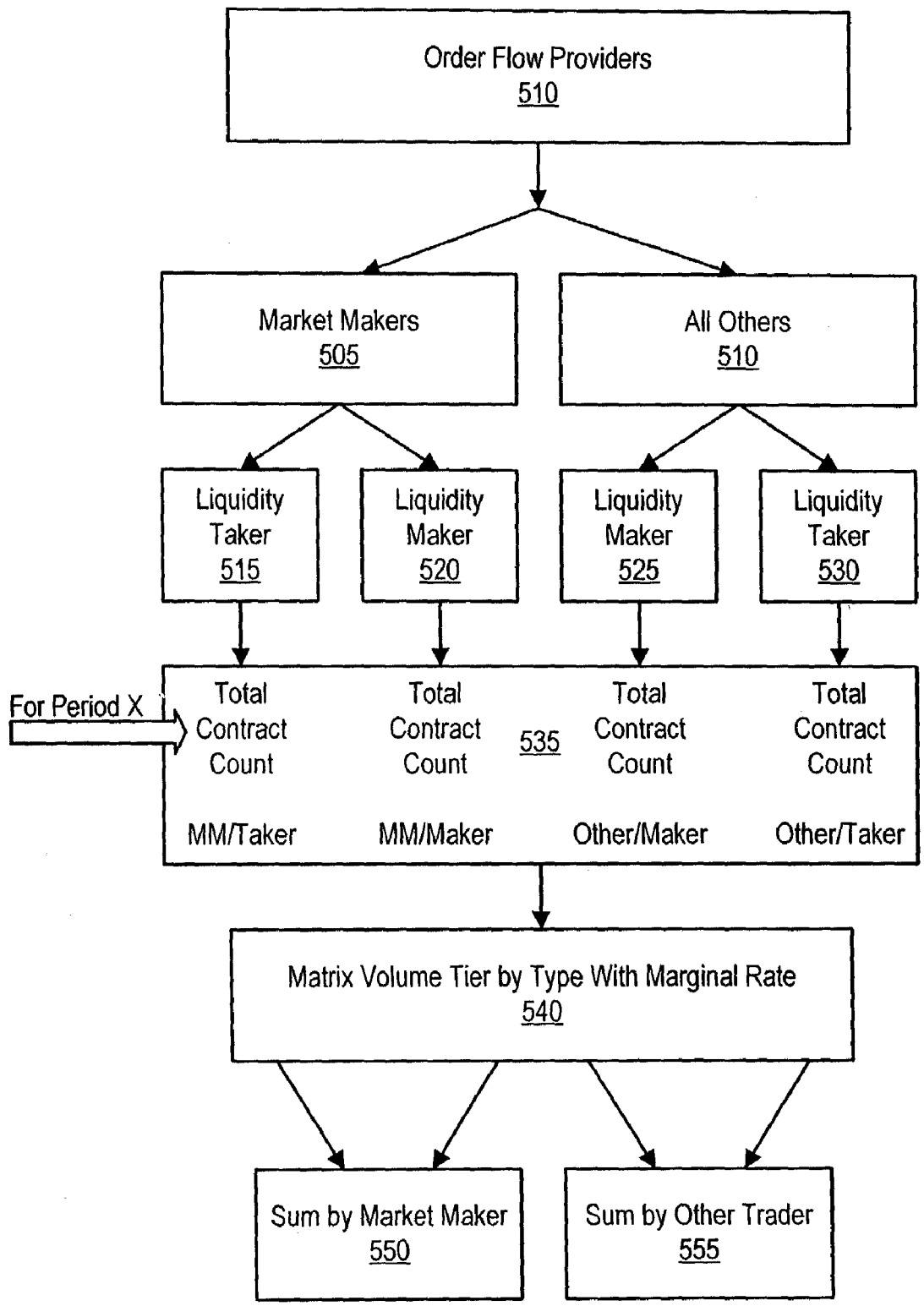
FIG. 5 illustrates an alternate flow diagram for promoting liquidity by considering factors in addition to relative time priority.

Another example of an additional factor that can be included in the fee calculation matrix 460 is the status of the particular trading entities associated with a matched trade. FIG. 5 illustrates an alternative or additional embodiment of the present invention wherein the various order flow providers for the matched trades (step 510) are separated into categories based upon their trading status. In the example shown in FIG. 5, two classifications are used so that all orders for matched trades which were placed by contractual market makers are separately collected (step 505), and all orders from matched trades that were placed by any other type of trader are separated and collected together (step 510). This segregation by trading class allows different rebates and charge rates to be applied, depending upon whether the trade is associated with a contractual market maker or some other type of trader.

For the market maker orders, the liquidity takers are identified (step 515) by, for example, determining that the particular order in question was submitted after the order on the other side of the trade through extraction of the pertinent trading data. Similarly, a particular market maker's order is identified as a liquidity maker (step 520) by determining that the specific order was placed prior to the order on the other side of the matched transaction in question by, for example, extracting the pertinent trading data from both sides of the matched trade.

In similar fashion, all orders from the matched trades that were submitted by other types of traders (step 510) are analyzed to identify those that qualify as liquidity makers (525) and liquidity takers (530). If implemented on a periodic basis, the foregoing information can be accumulated and compiled into separate categories of information (step 535). For example, by assembling "all other" matched trades over the course of a month at step 510, all of the orders for each trader that qualified as liquidity makers may be added to obtain a total contract count (step 535), and likewise all orders that qualify as liquidity takers can be added together to form a total contract count for the trader (step 535). The periodic accumulation of contract totals can also be broken down by individual contract market makers (step 505) for purposes of generating a monthly statement (step 540). Similarly, the periodic total of liquidity maker and liquidity taker orders can be obtained for all nonmarket maker traders, and further broken down by individual traders for purposes of generating account statements (step 540). For each trader, the monthly total counts for the matched liquidity maker and liquidity taker orders can be maintained separately or, in the alternative, can be combined to obtain a net maker/taker contract account for market maker (step 550) or other traders (step 555).

According to another aspect of the present invention, the calculation of fees, rebates and/or charges may be further structured to take into account the trader's status by, for example, providing different rates of rebates or charge depending upon the trader's classification. For example, the contractual market maker may be provided a favorable rate of rebate in comparison to other types of traders at step 540, thereby incentivizing liquidity promoting activity in the market by contractual market makers. Alternatively, another class of traders may be provided with preferential rate treatment in order to incentivize specific trading activity. For example, trading by individuals may be promoted through provision of a preferential rebate rate for trades executed by such individuals. Alternatively, if trading by institutional investors is a desired outcome, then a preferential rebate rate can be applied to trades executed from such institutional investors.

Figure 6:
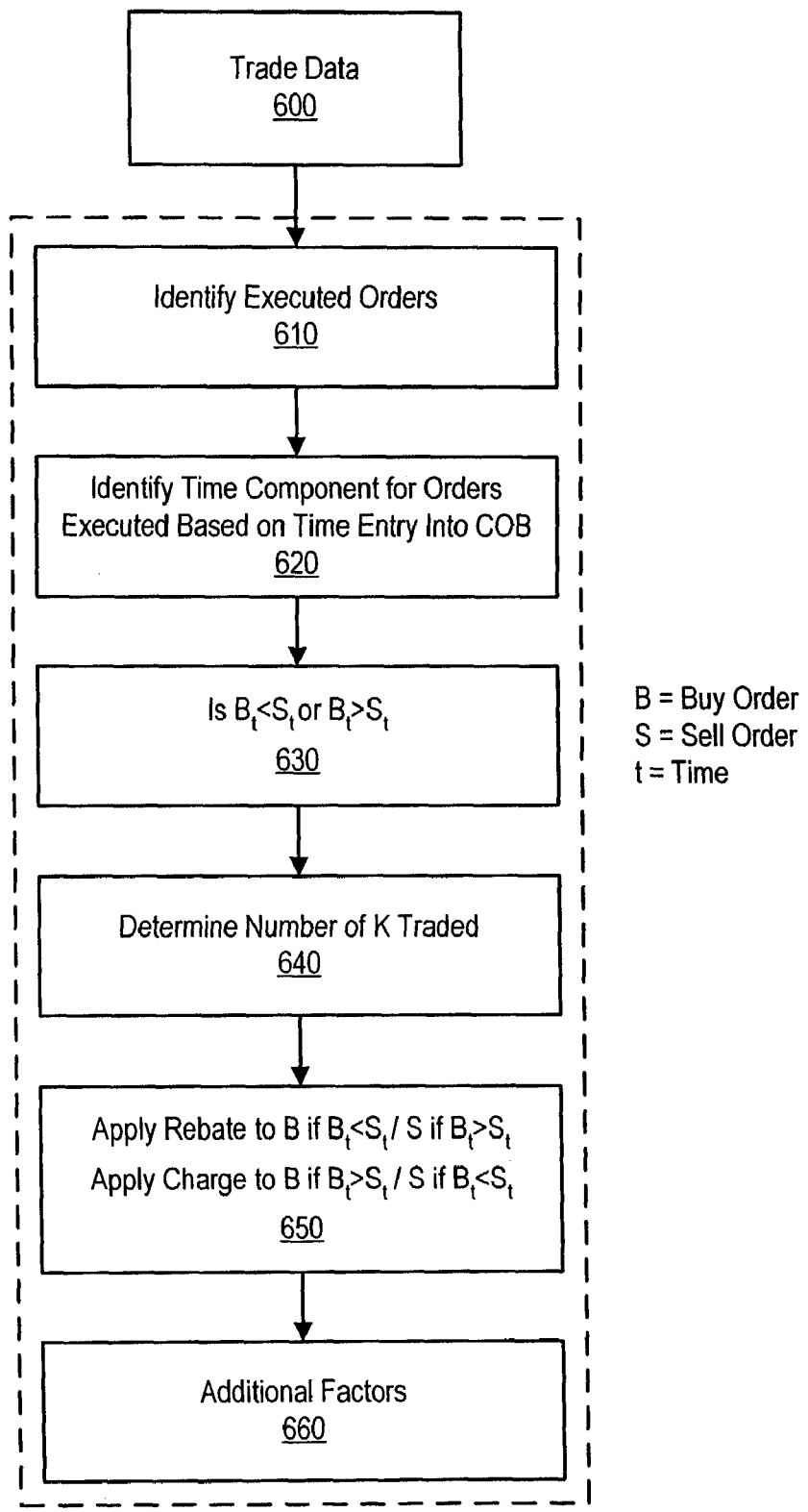
FIG. 6 illustrates an alternative methodology for dynamically controlling market liquidity through a multifactored determination of rebates and/or charges.

An alternative embodiment of the present invention is depicted in FIG. 6 which illustrates a methodology for dynamically controlling market liquidity through a multifactored determination of rebates and charges. As an initial step, pertinent trading data is accumulated and stored (step 600). It will be appreciated that the data can be obtained from the trading host, from the trade registration system, from the clearinghouse or from any other centralized repository of trading data for executed trades. The executed orders and partially executed orders are identified and the corresponding trading data is collected at step 610. For each executed trade, the time value of the underlying orders is extracted from the centralized order book (step 620). Where the time value is expressed in a military time format or other uniquely identifiable way of dating the order, it can be determined whether the buy order time occurred before or after the corresponding sell order time at step 630.

Whichever order is determined to be the earlier order, it is treated as the liquidity maker and the number of futures contracts that were traded with that order are extracted at step 640. Likewise, whichever of the buy or sell orders occurred later in time is treated as the liquidity taker at step 630, and the information concerning the number of futures contracts traded according to the liquidity taker order is extracted at step 640 from the trading data. After determining the standard fee that would apply to each side of the executed trade, a rebate is then calculated and applied to the earlier of the orders at step 650. In addition or in the alternative, a charge can be assessed in addition to the standard fee for the order which removed liquidity from the market. The rebate or charge can be applied as a straight multiplication of a rebate or charge rate against the number of contracts traded. Alternatively, additional factors can be included in the fee calculation (step 660). For example, differential rates can be applied, depending upon the status of the trading entity. In addition, a tiered rate structure may be provided depending upon the volume of trading activity.

In accordance with another aspect of the present invention, the futures trading exchange maintains a continuous balance of each market participant's transactions wherein different rates of debits and credits are applied to different break points using volume-tiered rates. For example a market participant may be assessed $X for 0-1000 transactions, $X-$0.1 for 1001-2000, transactions, and $X-$0.15 for 2001-3000 transactions, and so on, each month. By maintaining a balance of debits and credits over the course of a month (or other predetermined time interval), a net balance is presented to each member for payment (or rebate) at the end of the month.

Thus, as described and disclosed herein, the present invention provides an improved computerized exchange for transacting sales of derivatives contracts using a plurality of remote trading machines. As will be appreciated, the remote trading machines or terminals (e.g., 10, 20) may be "smart" terminals, "dumb" terminals or some hybrid between the two. If a remote terminal is a "smart" terminal, it may include a microprocessor having its own internal or external memory, a keyboard and a display or other output device for conveying information to the user. A "dumb" remote terminal has only limited local processing capability, but includes a display or other output device for conveying information to the user.

Included as part of the trading host 120 or trade registration system 130 is a fee system 130 or fee calculator for calculating a fee associated with a trade. In a selected embodiment, the fee is calculated by a fee processor, such as a central processor or dedicated processor. The fee processor provides a preferential fee for any bid or offer that qualifies as a liquidity maker. A variety of techniques and mechanisms are disclosed for determining which bids and offers of an executed trade qualify as the liquidity maker. In a selected embodiment, a rate schedule is provided as a component of the overall system for calculating fees. The rate schedule may include transaction fees and/or rate tiers, and is used to control the billing rates and amounts for various tiers of options. As will be appreciated, the rate schedule is preferably a flexibly configured schedule to provide tiered rates that are definable by volume levels and/or transaction type. For example, the rate tiers and transaction fees may include date limitations defining the temporal limits of when the rate tiers and fees are valid. One example would be a parameter indication of a Valid From Date and another parameter indication of a Valid To Date. In addition, the rate schedule may include default rates which would apply when no other rate is specified. The rates can be defined at a global level, firm level or ITM level. In addition, the rates can be different for ITMs within firms, and can be either negative or positive. The rate schedule aspect of the present invention allows for manual adjustment of a rate for a given date range. In addition, minimum and maximum values are provided for every rate tier.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

We claim:

1. A screen-based electronic system used for trading futures commodity contracts in varying volumes or lot sizes by futures market makers or other market participants using a plurality of remote futures trading terminals, said system comprising:
   a centralized futures trading host server communicatively coupled to the remote trading terminals for imposing futures margin limit requirements on each bid and offer received from the remote terminals prior to storing the bid or offer in a consolidated limit order book, comprising:
   a matching engine for automatically matching bids and offers using a price/time priority;
   a matched trade database containing trading data for matched bids and offers, including a bid time value and an offer time value; and
   a fee calculator for periodically determining a fee to be charged for each bid and offer that is matched, where the fee includes a first rebate credit for the bid or offer that has the earlier time value, and includes a second rebate credit if the bid or offer having the earlier time value was submitted by a futures market maker, and where the fee includes a first surcharge for the bid or offer that has the later time value, and includes a second surcharge if the bid or offer having the later time value was submitted by a futures market maker.

2. The system for trading futures commodity contracts of claim 1, wherein the first rebate credit is smaller than the second rebate credit.

3. The system for trading futures commodity contracts of claim 1, wherein either the first rebate credit or the second rebate credit is calculated using volume-tiered rebate rates.

4. The system for trading futures commodity contracts of claim 1, wherein the fee calculator generates a monthly report for a particular market participant by aggregating all rebate credits that apply to the matched bids or offers for the market participant and applying the aggregated rebate credits against any other fees assessed against the market participant.

5. The system for trading futures commodity contracts of claim 1, wherein the fee surcharge is calculated using volume-tiered charge rates.

6. An automated system for transacting a sale of a single stock futures commodity contract using a plurality of trading terminals wherein bids or offers for a particular single stock futures commodity contract are made through remote terminals, said system comprising:
   a trading repository for receiving and storing bids and offers from the remote terminals in a consolidated limit order book, imposing futures margin limit requirements on each bid and offer in the consolidated limit order book, and assembling for each bid and offer trading data identifying a time value and a trading entity identification,
   a processor for automatically matching bids and offers using one of a plurality of predetermined matching prioritizations, including a price/time matching prioritization, and generating a matched trade report; and
   a fee calculator for promoting market liquidity for the single stock futures contracts by extracting time value data for each matched bid and offer from the matched trade report and assigning a first rebated fee to the bid or offer having the earliest time value.

7. The automated system of claim 6, wherein the fee calculator further comprises a processor for extracting the trading entity identification for each matched bid and offer from the matched trade report and assigning a second rebated fee to the bid or offer if the trading entity identification corresponds to a market maker.

8. The automated system of claim 6, wherein the fee calculator further comprises a processor for extracting trading volume data for each matched bid and offer from the matched trade report and assigning the first rebated fee if the trading volume data exceeds a predetermined minimum requirement.

9. The automated system of claim 6, wherein the fee calculator further comprises a processor for extracting trading volume data for each matched bid and offer from the matched trade report and assigning the first rebated fee if the trading volume data is below a predetermined minimum requirement, and assigning a second rebated fee if the trading volume data is at or above the predetermined minimum requirement.

10. The automated system of claim 6, wherein the fee calculator further comprises a processor for assigning a first charged fee to the bid or offer having the later time value.

11. The automated system of claim 10, wherein the fee calculator periodically generates a statement for each market participant including an accumulated total of rebated fees and charged fees for all matched bids and offers submitted by the market participant.

12. A protocol for transacting a sale of a particular derivatives contract by market participants, including at least one derivative market maker, the protocol comprising:
   receiving at a central processor bids and offers on a particular derivative contract from remote terminals, storing the bids and offers along with associated time value data for each received bid and offer, determining margin limit requirements on each stored bid and offer;
   automatically matching equal bids and offers using one of a plurality of predetermined prioritization schemes, including at least a first come, first served prioritization scheme, for each matched bid and offer, determining from the associated time value data which bid or offer occurred first in time to identify a liquidity maker, calculating a rebated fee to be assessed to the liquidity maker.

13. The protocol of claim 12, wherein the derivatives contract comprises an interest rates contract, a swap, equities, futures interest in an exchange traded funds, indices, futures or a single stock futures contract.

14. The protocol of claim 12, further comprising identifying for each matched bid and offer a liquidity taker from the associated time value data and calculating a debited fee to be assessed against the liquidity taker.

15. The protocol of claim 12, further comprising calculating a preferred rebated fee for any bid or offer submitted by a derivative market maker.

16. The protocol of claim 12, wherein the rebated fee is calculated using a first rebate rate for a bid or offer having a size that is below a predetermined threshold, and using a second rebate rate for a bid or offer having a size that is above the predetermined threshold.

17. The protocol of claim 12, wherein the storing of bids and offers stores only bids and offers meeting predetermined margin requirements.

18. The protocol of claim 12, wherein the rebated fee is calculated using volume-tiered rebate rates.

19. A computerized futures contract trading exchange used for transacting sales of a particular futures commodity contract using a plurality of remote client trading machines, each of which contains a client trading application, where the client trading machines are configured to submit bids and offers and pre-negotiated trades, said exchange comprising:

a trading host for automatically determining price limits and/or margin limits for each futures commodity contract and matching bids and offers on either a price/time priority or a price/pro-rata priority, comprising a central order book;

a trade registration system for automatically assembling trading data on matched and pre-negotiated trades during the trading day, for generating an audit trail report after the close of trading, and for generating a matched trade report after the close of trading;

a fee system for calculating fees associated with each trade by providing a rebate for any bid or offer that qualifies as a liquidity maker;

a clearing house for clearing and settling matched trades after the close of the trading day, based on information contained in the matched trade report;

a regulator for performing audit-trail and compliance monitoring on executed trades after the close of the trading day, based on information contained in the audit trail report.

20. In a computerized derivatives contract trading exchange used for transacting sales of a derivatives contract using a plurality of remote trading machines, a fee calculation processor for calculating a fee associated with a trade by providing a preferential fee for any bid or offer that qualifies as a liquidity maker.

\* \* \* \* \*